Figure 1:
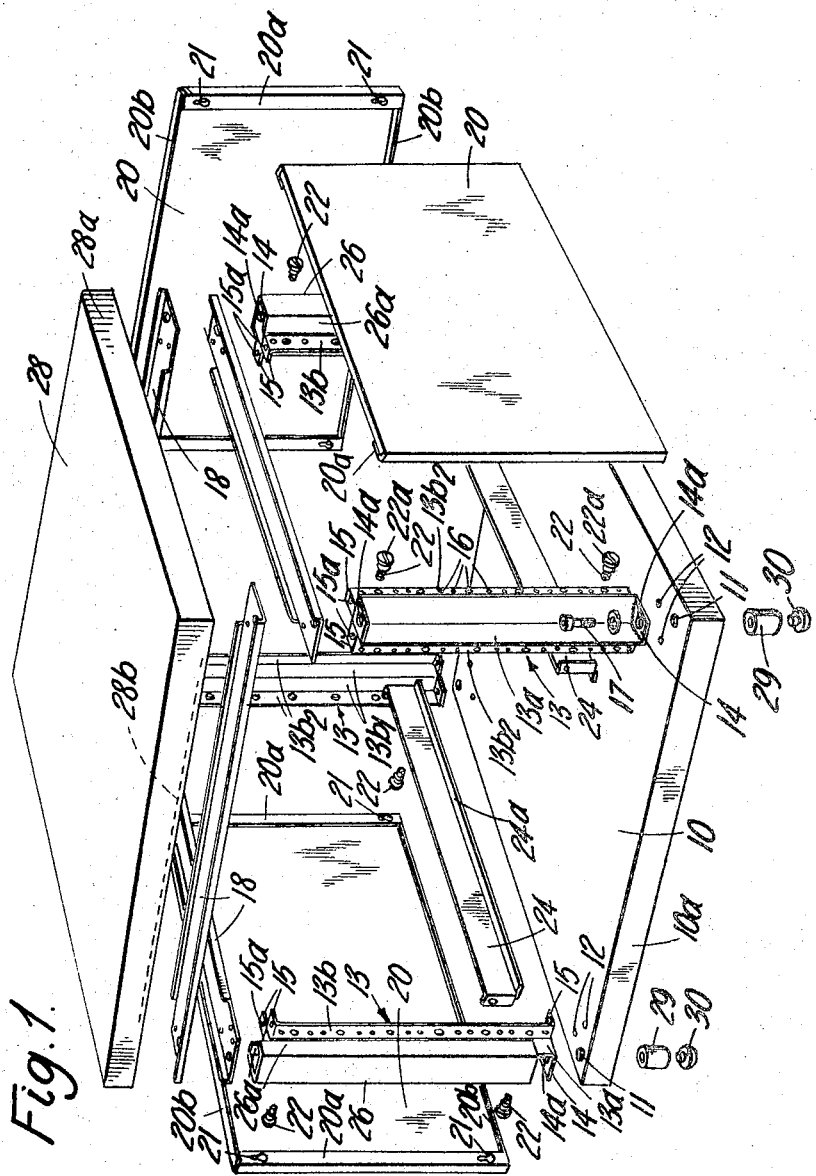

March 7, 1967 D. COLLIER 3,307,894
STRUCTURAL MEMBERS FOR MODULAR UNITS
Filed May 4, 1965 2 Sheets-Sheet 1

INVENTOR
DAVID COLLIER
BY
Bacon & Thomas
ATTORNEYS

March 7, 1967  D. COLLIER  3,307,894
STRUCTURAL MEMBERS FOR MODULAR UNITS
Filed May 4, 1965  2 Sheets-Sheet 2
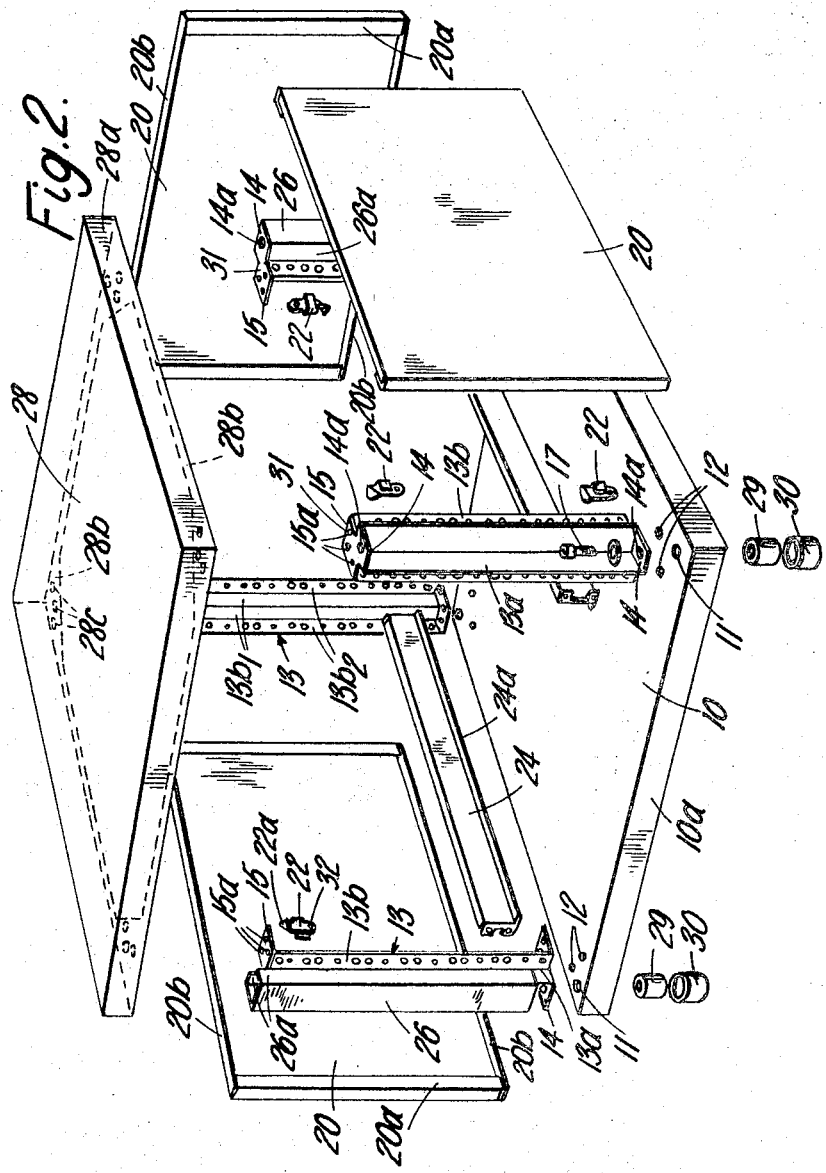
INVENTOR
DAVID COLLIER
BY
Bacon & Thomas
ATTORNEYS United States Patent Office 3,307,894
Patented Mar. 7, 1967

3,307,894
STRUCTURAL MEMBERS FOR MODULAR UNITS
David Collier, London, England, assignor to C. & N. (Electrical) Limited, Hampshire, England, a British company
Filed May 4, 1965, Ser. No. 453,085
Claims priority, application Great Britain, May 4, 1964, 18,459/64
10 Claims. (Cl. 312—257)

This invention comprises improvements in or relating to structural members and arrangements, particularly for use with modular units of equipment such for instance as may be used to build up a piece of electrical or electronic equipment. Such units are usually supported in cabinets, racks, cases, or other structures so designed that the positions of units can be interchanged readily and that units can be readily replaced.

According to the present invention, a structural member for use in cabinets, racks, cases or other support structures, such for instance as are used for modular units, is of angle or equivalent main section, is of substantial length, has auxiliary lengthwise-extending flanges for attachment or location of other parts of the structure, and has its end features enabling the member to be connected to other parts of the structure.

According to a preferred form, the support member has the auxiliary flanges at right angles to and set back from the free edges of the webs of the main angle section. This may be achieved by securing, as by welding or riveting a W-section piece to the main angle section, the two middle webs of the W-section piece lying in contact with the external surfaces of the webs of the angle section at the vertex. The flanges may be formed with a lengthwise row of holes of selected spacing. The ends of the angle and W-sections may be blanked-off and the blanking pieces formed with bolt holes.

According to a feature of this invention in a structure including structural members as above set forth forming corners of the structure, some at least of the structural members have associated external surfacing skins which can be slid lengthwise onto the main sections and which are self retaining and if desired assist to retain parts mounted on the flanges firmly in position.

Each skin may consist of a pair of webs at right angles and, at the free edges of the webs, right angle flanges, so as to be an incomplete box section.

According to this invention a structure comprises a number of parallel or main structural members disposed apart each of which in cross section provide a number of flanges arranged at an angle to one another and extending along the length of the member two of which provide the main strength of the member and which auxiliary flanges provide means for securing other members of the structure between adjacent main structural members.

The two main flanges of each main structural member may be at right angles to one another and directed outwardly from the structure whereas the auxiliary flanges are set back from the outer edges of the main flanges and are disposed at right angles thereto so that they are directed inwardly of the structure.

In such arrangements the two main flanges may be provided by an angle section member and the auxiliary flanges are provided by a W-section member which is so disposed that its two inner flanges which are at right angles to one another abut the two main flanges and secured thereto by riveting or welding.

The outer flanges of the W-section member may be provided with a number of spaced holes along the length thereof for accommodating securing means for other members of the structure.

In any of the arrangements referred to above the spaces between the flanges of each main structural member at the ends thereof may be closed by closure members to which other members of the structure are attached.

In any of the arrangements referred to above the main structural members may be arranged at the corners of a rectangular structure with their main flanges directed outwardly and said other structural members are secured to the other flange of two of the corner members.

In such an arrangement the space between the main outwardly directed flanges of a corner member may be closed by a sheath having portions which engage with the rear faces of those flanges.

In such an arrangement the other members of the structure may comprise panels which are secured to the outer flanges of the W-section member.

In the case where the spaces between the flanges and the ends of the main structural members are closed by closure members a panel may be supported by the ends of the structural members and is secured to said closure members.

A cabinet structure for accommodating modular units of electronic equipment and incorporating the above and other features of the invention will now be described with reference to the accompanying drawing in which:

FIGURE 1 is an exploded view of the cabinet; and
FIGURE 2 is a similar view to that of FIGURE 1 showing certain modified details of the construction.

The structure has a sheet metal base 10 which is square in plan with a downwardly directed peripheral flange 10a. Near each corner there is a set of bolt holes 11, 12 for the attachment of four upright structural members 13.

Each upright is formed in two pieces welded or riveted together. The first and main piece 13a is of angle section with square fillets 14 closing the ends, each fillet having a centrally disposed bolt hole 14a. The second and auxiliary piece 13b is of W-section, the width of the two central webs 13b1 and the two edge flanges 13b2 being about half that of the webs of the angle section. There are two square fillets 15 secured at each end of the second piece, each fillet being in the angle between a central web 13b1 of the W-section 13b and its adjacent edge flange 13b2, and each fillet 15 has a bolt hole 15a in it. The two pieces 13a, 13b are fitted together with the two central webs 13b1 of the W-section lying flat against the external surfaces of the webs of the angle section 13a, so that the flanges 13b2 of the W-piece extend outwards from the webs of the angle section 13a at about their mid-width. The flanges 13b2 are perforated with a lengthwise row of holes 16 having a standard spacing.

The uprights are secured by bolts 17 to the base 10 with the recess of the angle section 13a facing the adjacent corner of the base and with the W-piece 13b facing the diagonally opposite corner. The sets of holes 11, 12 in the base 10 correspond in disposition and size to the holes 14a, 15a in the fillets at the ends of the structural members. The bolts 17 may retain internally threaded bushes 29 in which are fitted rubber feet 30.

If desired the uprights 13 may each consist of a plurality of these structural members joined together end-to-end.

The structure also includes channel-section transverse members 18 which can be secured to the uprights 13 by bolting to the fillets 14, 15.

The structure also includes rectangular side panels 20 which have flanges 20a, 20b around their edges, the shorter flanges 20a being of angle section and having key-hole slots 21 in their inwardly directed parts to engage heads 22a on support bolts 22 secured in appropriate holes in the flanges of the W-section 13b. The inwardly directed parts of the shorter flanges 20a stand clear of the longer edge flanges 20b. Like the uprights 13, each side may consist of one or more panels 20 and panels are omitted from one or more sides to allow modular units of equipment to be fitted in the cabinet and attached by nuts and bolts to the flanges of the W-sections 13b. These units may be inserted all from one side or partly from one side and partly from another side or other sides.

The structure also includes transverse members 24 which are bolted to the W-section 13b and which have flanges 24a forming guide shelves for the modular units.

Once all the units and panels associated with a particular upright 13 are in position, a corner skin 26 is fitted to the upright 13. The skin 26 is like a box section with one corner and parts of the two adjacent sides removed. The skin is slid on to the upright 13, so that the two remaining full sides of the box-section form the corner of the cabinet and the two short sides 26a extend in contact with the webs of the main sections 13a of the upright towards the flanges of the W-section 13b. The skins 26 thus not only give the corners a finished appearance but also assist to retain the panels 20 and modular units in position.

The structure also includes a top 28 which has a peripheral depending flange 28a so that it fits on the structure like a slide-on-lid. There may be an inwardly-directed flange 28b on any edge adjacent a surface which is set back from the peripheral flange of the top.

It will be appreciated that the parts above described can be used to form other structures than cabinets and that the positions of the modular units can be readily interchanged or altered.

As shown in FIGURE 2 instead of the ends of the upright members 13 and of the W-section members 15 being closed by separate fillets there may be provided a single fillet 31 shaped to fit between the flanges of the members 13 and 15 which single fillet is provided with the aforesaid holes 14a and 15a.

Also instead of the upper ends of the upright angle section members 13 and W-section members 15 being braced together by transverse members 18 as shown in FIGURE 1 the upper panel 28 may fulfill this purpose and is modified by arranging the flange 28b to extend around the whole of the lower edge of the depending flange 28a and is widened at its corners, as indicated at 28b, the widened portion 28b being provided with holes 28c which register with the holes 14a and 15a and receive securing screws.

Also instead of the upright flange of the panel 20 being provided with slotted holes 21 as in FIGURE 1, the panels may be secured to the flanges 13b of the W-section members by means of clips 22 each of which is pivotally connected to the rear face of a flange 13b by means of a screw passing through a hole 32 in the clip and through one of the holes 16 in the flange 13b. The clip is provided with a bent over lug 22a which may be brought into engagement with an upright flange 20a of a panel 20 which has been placed against the front face of the flange 13b.

Also instead of the rubber feet 30 being in the form of plugs they are formed with a sleeve for embracing the bushes 29.

I claim:
1. A structure comprising:
    (a) a plurality of spaced apart parallel main upright structural members;
    (b) each of said upright structural members, in cross section, defining two main flanges at right angles to one another and directed outwardly from the structure; and,
    (c) a W section member the inner limbs of which are at right angles to one another and abut and are secured to the outer faces of said two main flanges.
2. A structure according to claim 1 wherein the outer flanges of the W section member are provided with a number of spaced holes along the length thereof for accommodating securing means for other members of the structure.
3. A structure according to claim 1 wherein said main structural members are arranged at the corners of a rectangular structure with their main flanges directed outwardly, and wherein other structural members are secured to the other flanges of two of the corner members; and a sheath closing the space between the main outwardly directed flanges and having portions which engage with the rear faces of those flanges.
4. A structure according to claim 1 wherein the junctions between the inner and outer limbs of the W section member are disposed inwardly of the outer edges of the main flanges whereby each upright structural member in cross section comprises two V section portions arranged with their apices directed towards one another and joined by a bent portion constituted by the inner limbs or said W section member and the inner portion of said main flanges.
5. A supporting structure for equipment units comprising:
    (a) A plurality of spaced apart upright members, each of which, in cross section, defines two spaced V portions arranged with their apices directed towards one another with a bent portion between them;
    (b) one of the limbs of each V portion being provided with a number of holes one above the other;
    (c) cross members extending between the upright members and overlapping the limbs of the V portions provided with said holes; and
    (d) connectors engaging said holes and clamping the cross members to said limbs of the V portions.
6. A supporting structure according to claim 5 wherein the V portions and bent portions therebetween are formed from two separate elements:
    (a) one element being W shaped in cross section, adjacent limbs of which meet one another at right angles and the outer limbs of which are provided with said holes;
    (b) the other element having two flanges at right angles which interfit and are secured between the center limbs of the W section and project outwardly therefrom to define at least a part of the V shaped portions.
7. A supporting structure according to claim 5 and which is rectangular in configuration and has one of said upright members so disposed at each of the four corners that one limb of each V extends in a direction along the side of the structure.
8. A supporting structure according to claim 5 and which is rectangular in configuration and has one of said upright members so disposed at each corner that one limb of each V extends in a direction along a side of the structure and is provided with said holes, the other limb being directed outwardly from said side, and wherein the cross members are in the form of panels with their upright edges located between the limbs of said V shaped portions.

9. A supporting structure according to claim 5 and which is rectangular in configuration and has one of said upright members so disposed at each corner that one limb of each V extends in a direction along a side of the structure and is provided with said holes, the other limb being directed outwardly from said side, and wherein the space between the outwardly directed limbs of the two V portions is closed by a sheath having portions which engage the rear faces of said limbs.

10. A supporting structure according to claim 5 wherein the upper and lower ends of said upright members have secured thereto cover plates to which are secured upper and lower supporting panels.

References Cited by the Examiner

UNITED STATES PATENTS

| 1,706,028 | 3/1929 | Johnson | 52—282 X |
| 1,893,636 | 1/1933 | Ridgway | 52—281 X |
| 2,529,648 | 11/1950 | Borton | 52—282 X |
| 2,667,241 | 1/1954 | Shannon | 52—281 X |

FOREIGN PATENTS 1,020,666   11/1952   France.

CLAUDE A. LE ROY, *Primary Examiner.*

F. DOMOTOR, *Assistant Examiner.*